United States Patent [19]
Limet et al.

[11] Patent Number: 5,356,074
[45] Date of Patent: Oct. 18, 1994

[54] THERMOSTATIC MIXING DEVICE

[75] Inventors: Henri D. Limet, Reims; Francois P. Vogt, Jonchery Sur Vesle; Jacques R. Debaecker, Tinqueux, all of France; Kathleen S. DeKeyser, Hingham, Wis.

[73] Assignee: Jacob Delafon, Paris, France

[21] Appl. No.: 148,787

[22] Filed: Nov. 5, 1993

[51] Int. Cl.⁵ ............................................. G05D 23/13
[52] U.S. Cl. .................................. 236/12.22; 137/625.4
[58] Field of Search .............. 236/12.21, 12.22, 12.16, 236/12.1; 137/625.4

[56] References Cited

U.S. PATENT DOCUMENTS

| | | | |
|---|---|---|---|
| 1,176,212 | 3/1916 | Fulton | 236/12 |
| 1,208,130 | 12/1916 | Fulton | 236/12 |
| 2,141,520 | 12/1938 | Dube | 236/12 |
| 2,172,489 | 9/1939 | Young | 236/12.22 |
| 2,489,896 | 11/1949 | Kempton | 236/12 |
| 3,366,328 | 1/1968 | Feinberg | 236/12.22 |
| 3,413,969 | 12/1968 | Whittell, Jr. | 236/12.22 X |
| 3,561,482 | 2/1971 | Taplin | 236/12.22 X |
| 3,955,759 | 5/1976 | Knapp | 137/625.4 X |
| 4,306,582 | 12/1981 | Marshall | 137/100 |
| 4,760,953 | 8/1988 | Trubert | 236/122 |
| 4,767,052 | 8/1988 | Kostorz et al. | 236/12.2 |
| 5,011,074 | 4/1991 | Kline | 236/12.1 |
| 5,067,513 | 11/1991 | Nicklas et al. | 137/98 |
| 5,148,976 | 9/1992 | Reid | 236/12.2 |
| 5,242,108 | 9/1993 | Heimann et al. | 236/12.1 |
| 5,251,811 | 10/1993 | Frankholz | 236/12.1 |

OTHER PUBLICATIONS

A Vargarda Ad, undated.
Four pages of a 1990 Grohe America Ad entitled "Grohmix Thermostatic/Pressure Balance Valves".

*Primary Examiner*—William E. Tapolcai
*Attorney, Agent, or Firm*—Quarles & Brady

[57] ABSTRACT

A fluid mixing device which can adjust for temperature fluctuations of fluids wherein a thermal expansion element drives a reciprocating member and has a portion extending into and through a fluid inlet. In a preferred embodiment, the inlet is a common inlet for both hot and cold fluids and the flow of fluid is controlled as it exits from the mixing device. A fluid mixing device which is highly responsive to fluid temperatures results and is particularly suited for use in plumbing fixtures of various types.

10 Claims, 4 Drawing Sheets

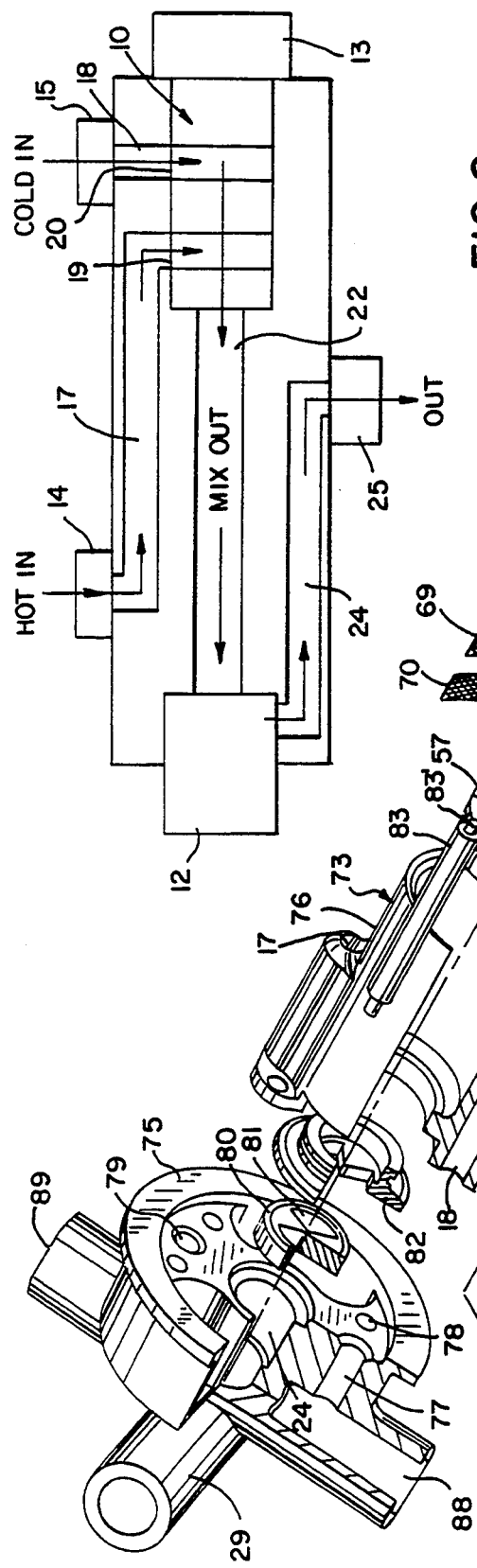
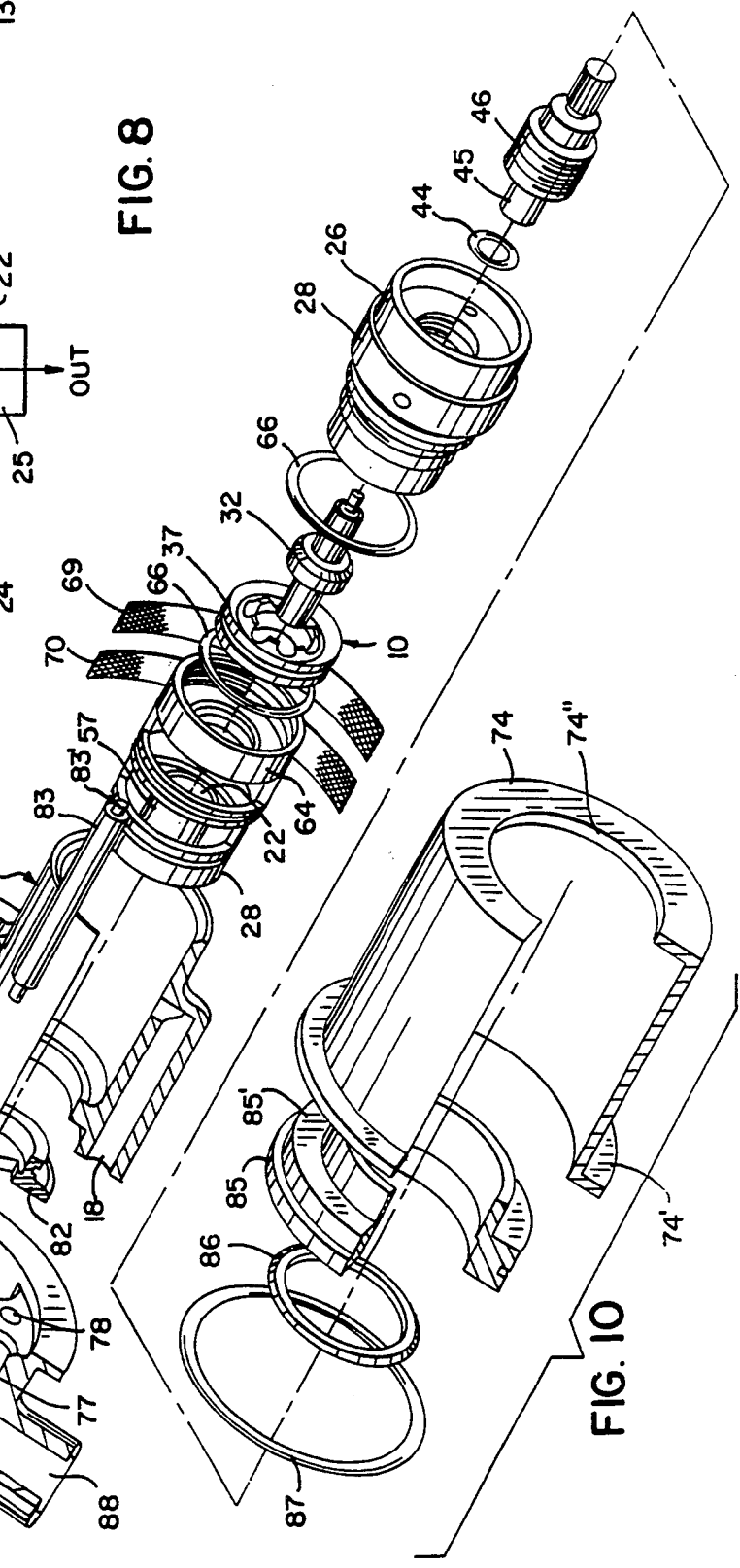

THERMOSTATIC MIXING DEVICE

BACKGROUND OF THE INVENTION

A. Field Of The Invention

This invention relates primarily to faucets which mix hot and cold water. More particularly, the invention relates to faucets where the temperature of the exiting water is substantially maintained at a preselected temperature, notwithstanding abrupt changes in hot and/or cold water supply pressures.

B. Description Of The Art

A number of types of thermostatic mixing valves which automatically regulate water temperature are well known. For example, see U.S. Pat. Nos. 4,760,953 and 5,148,976. Both of these patents disclose a temperature responsive member which can effect axial movement of a valve member to regulate the proportioning of flow of hot and cold water into a mixing chamber in response to abrupt changes in the temperature of the supplied water and/or the pressure of the supplied water. In the instance of the 4,760,953 patent, valve-forming sleeves are employed in order to improve the performance of the valve. In the 5,148,976 patent, a particular temperature responsive element is utilized. The use of added or special components adds to the cost of a valve, as well as added maintenance costs.

A need exists for an improved thermostatic mixing valve which can be manufactured with fewer parts and still maintain accurate temperature control. A need also exists for a thermostatic valve which is highly responsive.

SUMMARY OF THE INVENTION

In one aspect, the invention provides a fluid mixing device for controlling the temperature of hot and cold fluids, the device including a body member having an internal chamber. There is at least one inlet to the chamber for bringing to the chamber a supply of hot fluid, one inlet to the chamber for bringing to the chamber a supply of cold fluid, and one outlet from the chamber for receiving from the chamber a mixture of the hot and cold fluid. A reciprocating member is operatively positioned in the chamber and has a portion extending radially therefrom into the hot and cold fluid inlets. A thermal expansion element is connected to the reciprocating member, the thermal expansion element construction and arranged to reciprocate the portion of the reciprocating member in the hot and cold fluid inlets in relation to the temperature of the hot and cold fluids.

In one aspect, inlets for supplying hot and cold fluids are provided by a common orifice that is divided by a portion of the reciprocating member.

In yet another aspect, the body member is positioned in an outer valve cartridge housing which retains filtering means upstream of the body member's inlets.

In another preferred form, there are volume control means downstream of the outlet for regulating the flow of the fluids from the mixing device and adjustment means connected to the thermal expansion element for regulating a steady state temperature.

In another aspect, the control means and the adjustment means are positioned at opposite ends of the body member.

In yet another aspect, the control means and the adjustment means are concentrically positioned at the same end. In yet another preferred form, a portion of the reciprocating member extends beyond an outside wall of body member and also sealingly abuts an inside surface of a housing.

The objects of the invention therefore include:

a. providing a mixing device of the above kind which is highly responsive to temperature conditions;

b. providing a mixing device of the above kind which can accurately adjust for differences in hot and cold water supply pressure and supply temperature;

c. providing a mixing device of the above kind which can be manufactured with few parts;

d. providing a mixing device of the above kind which is in a cartridge form, and is easily replaced yet affords a water tight fitment; and e. providing a mixing device of the above kind wherein the flow of fluid is controlled from a valve outlet. These and still other objects and advantages of the invention will be apparent from the description which follows. In the detailed description below, the preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 8 is a diagrammatic view illustrating the mixing device;

FIG. 10 is an exploded perspective view of a valve with a second embodiment of the mixing device.

DESCRIPTION OF THE PREFERRED EMBODIMENTS

Figure 1:
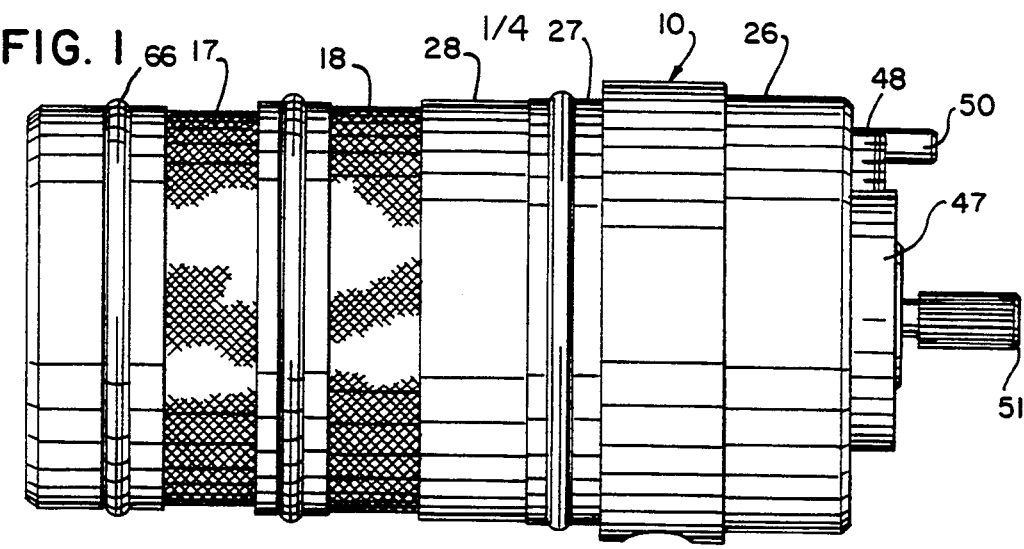
FIG. 1 is a side view of the key portions of the mixing device of this invention.

Referring to FIGS. 1 and 8, the fluid mixing device generally 10 is shown in conjunction with a temperature adjustment 13 and flow control apparatus 12. Valve 12 can be any standard volume control valve. The direction arrows in FIG. 8 illustrate the pathway of water through the cartridge mixing device from a hot water pipe 14 and a cold water pipe 15 through the hot water passage 17 and cold water passage 18, as well as the hot and cold water inlets 19 and 20. From there, the hot and cold water passes into the temperature regulating mixing device 10 and out through a passage 22 to the flow control 12 which also serves as an on/off valve. From the flow control 12, the water flows through passage 24 to a bathing fixture 25, such as a showerhead.

Figure 2:
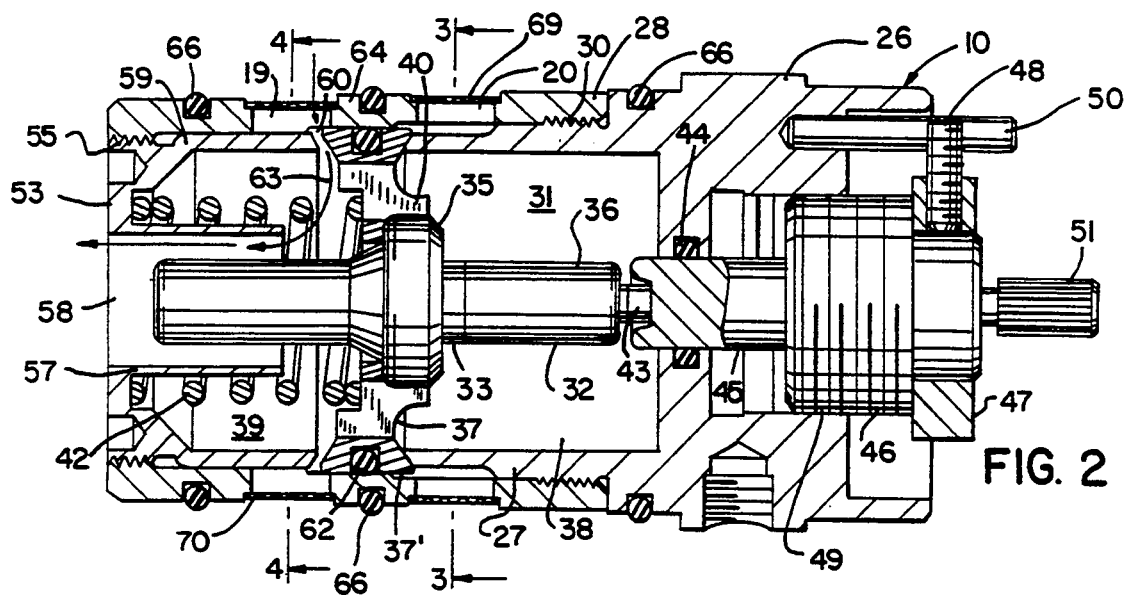
FIG. 2 is a view in cross section of FIG. 1.

Referring to FIG. 2, the fluid mixing device 10 has a cartridge 26 formed in two main cylindrical components, body 27 and housing 28. These are connected by the threads 30. A cavity or chamber 31 is provided in body member 27 in which is disposed a thermal expansion element 32. It includes an expandable wax housed in a brass cartridge 33 with an enlarged diameter section 35 for seating on a reciprocating disk member 37.

Arm members 40 extend from disk member 37 for a positive seating of the enlarged diameter section 35. A spring 42 is placed in the cavity 31 and provides a biasing force on the disk member 37 as well as the thermal expansion element 32 which (by means of pin portion 43) is held against adjustment stem 45. An enlarged threaded section 46 affords (by rotation) axial adjustment of stem 45. A seal is shown at 44. Collar 47 with a stop 48 is connected to stem 45 which acts in conjunction with stop 50 or body member 26 to limit rotation. The stop 48 also connects the collar 47 to the stem 45. A handle 13 (FIG. 8) is placed on knurled portion 51.

The lower body 53 is connected to housing 28 by threads 55 and provides a central passageway 57 and a fluid outlet 58. Lower body 53 also provides a seat and guide for spring 42 and has a wall 59 which terminates below the upper body part of body member 27. This spacing affords a common inlet gap 60 for hot and cold water.

Figure 3:
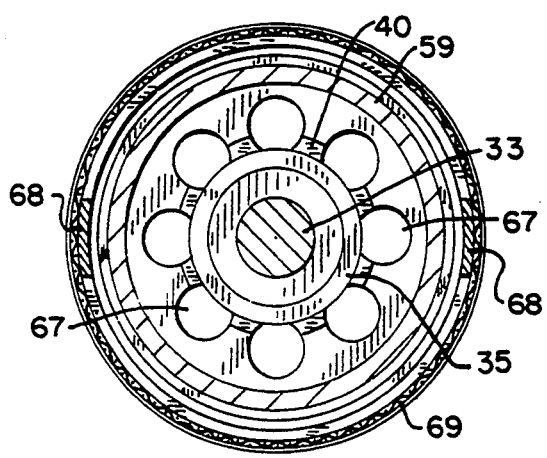
FIG. 3 is a sectional view taken along line 3—3 of FIG. 2.
Figure 4:
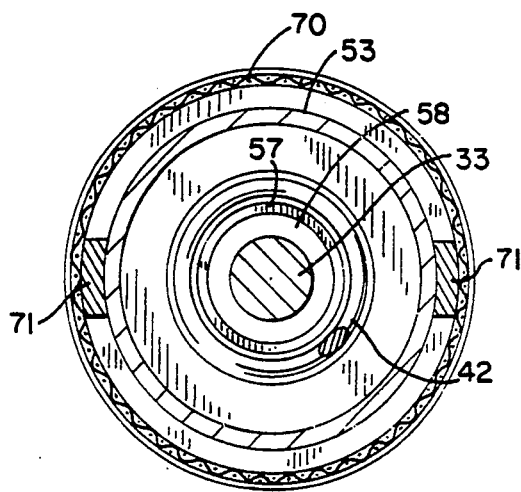
FIG. 4 is a sectional view taken along line 4—4 of FIG. 2.

Disposed radially outward of inlet 60 is an intermediate section 64 of housing 28 which is spaced therefrom by connecting walls 68 and 71. This is best seen in FIGS. 3 and 4. A seal 62 is disposed between the extending portion 37' of disk 37 and intermediate section 64. Screens 70 and 69 are placed in the respective hot and cold water passages 19 and 20 of housing 28. Seals 66 afford a fluid tight connection with a surrounding valve fixture.

An important feature of this invention is the reciprocating disk member 37 with the portion 37' which extends into and preferably through a common inlet 60 for introducing hot and cold water into cavity 31. This feature provides advantages in mixing the flow of the hot and cold water prior to contact with the thermal expansion element 32. Its design also reduces inertial forces to move the disk member 37 as only a single seal 62 is required.

As viewed in FIG. 2, the extending portion 37' can close the common inlet 60 to the flow of cold water yet allows entry of hot water into chamber 31 as seen by directional arrows 63. This could be the case when the supply water is below steady state values.

Figure 5:
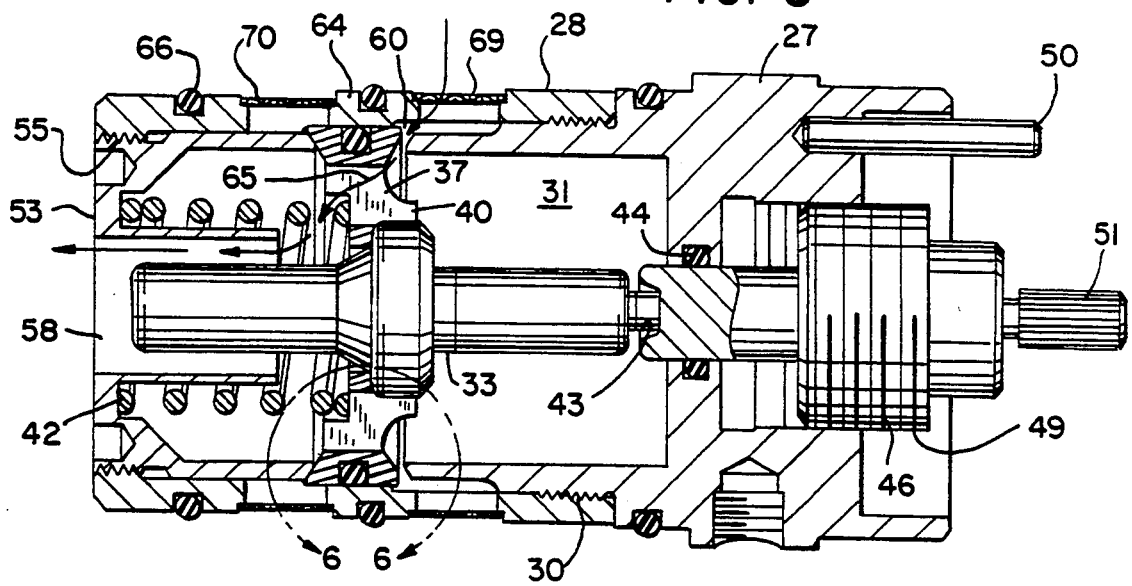
FIG. 5 is a view similar to FIG. 2, showing the mixing device in another mode of operation.

As viewed in FIG. 5, the opposite can be achieved when the hot water supply temperature spikes, or when the cold water pressure drops. Cold water is free to flow as indicated by directional arrows 65 into and mix with hot water in cavity 31 by passing through the passages 67 in the disk member 37 (See especially FIG. 3).

Figure 6:
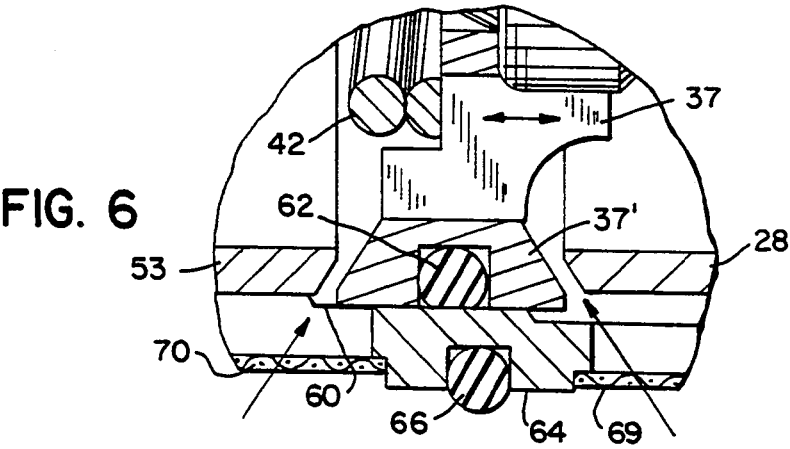
FIG. 6 is an enlarged detailed view taken along line 6—6 of FIG. 5.

Referring back to FIG. 2, if the temperature of the hot water should suddenly rise, this effects an expansion of the thermal expansion element 32 and particularly sections 35 and 36. This causes the extending portion 37' to move from right to left, thereby opening the common inlet 60 more to cold water as seen in FIG. 5. Conversely, and considering the position of the extending portion 37' at the left side of inlet 60 as shown in FIG. 5, if the temperature of the cold water should suddenly decrease, this causes a contraction of the thermal expansion element 32 which causes the reciprocating member to move to the right thus opening the common inlet to hot water. An intermediate position of the reciprocating portion 37 in common inlet 60 is shown in FIG. 6 and exemplifies the mixing of hot and cold water prior to contact with the thermal expansion element 32.

Figure 7:
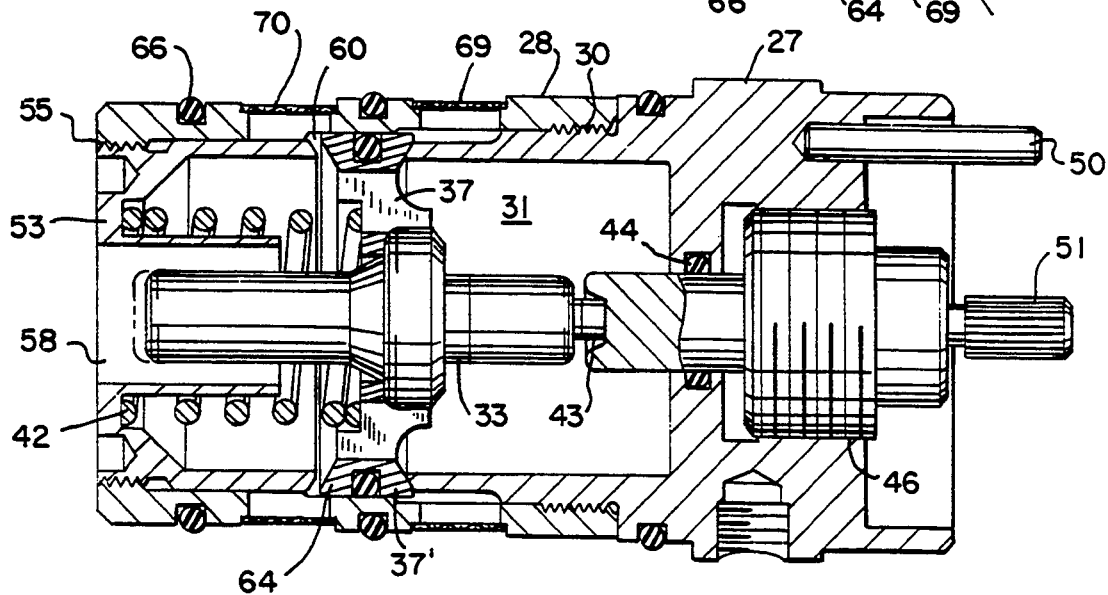
FIG. 7 is a view similar to FIG. 2, showing yet another mode of operation.

A steady state adjustment of the thermal expansion element 32 is effected by a turning of a handle on knurled portion 51 which by means of screw threads 49 on section 46 causes adjustment stem 45 to move in and out and thereby drive the thermal expansion element 32 in and out along with disk member 37 and extending portion 37' This is seen in conjunction with FIG. 7 in comparison to FIGS. 2 and 5. As stated earlier, rotation of a handle can be limited by stop pin 50 which can interact with a stop 48 on collar 47.

Figure 9:
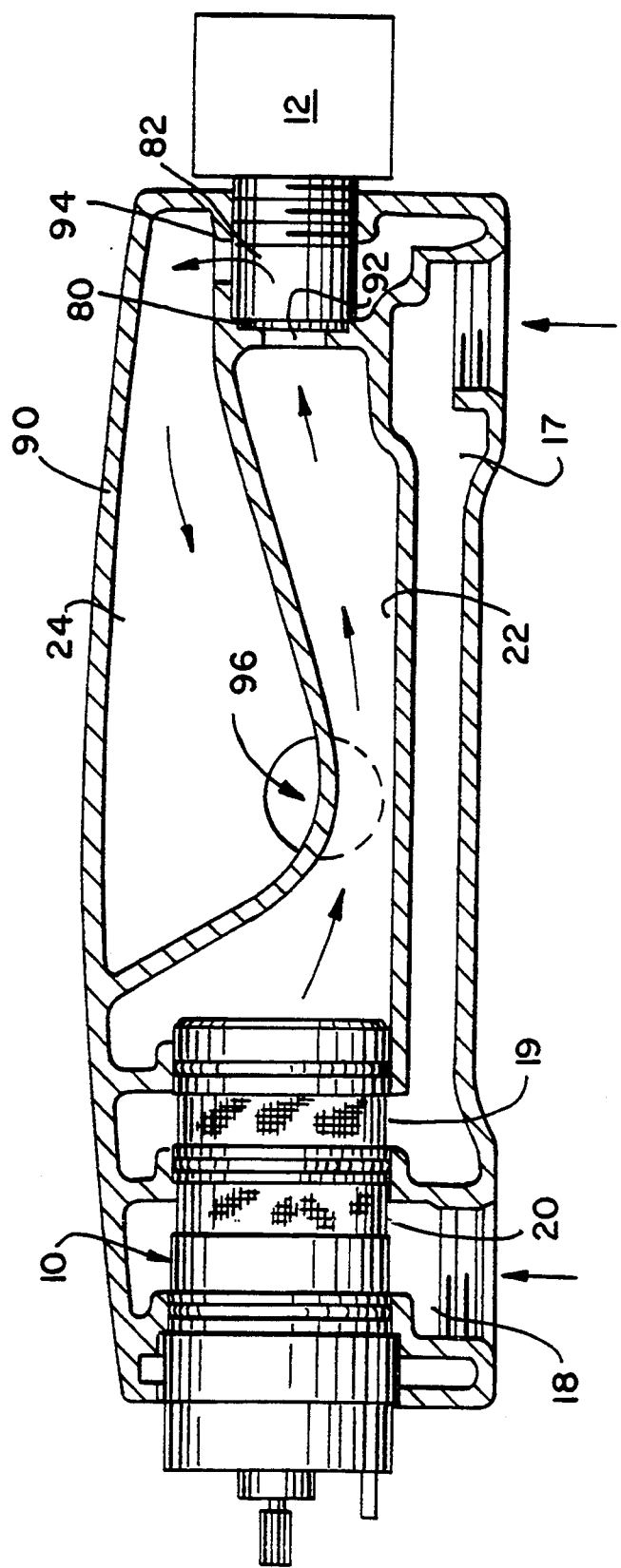
FIG. 9 is a cross sectional view of a faucet for use with the mixing device.

FIG. 9 illustrates the mixing device 10 in conjunction with a faucet 90 which is used in conjunction with a shower as indicated in FIG. 8. Cold water enters passage 18 and hot water through passage 17. Cold and hot water enter the inlets 20 and 19, respectively, of the thermostatic mixing device 10. After temperature regulation in mixing device 10, the mixed water flows into chamber or passage 22 where the flow is regulated after entering port 92 by the flow control 12 having the usual movable and stationary disk arrangement 82 and 80 as later described in conjunction with valve unit 73. Water exits the flow control 12 through port 94 and chamber or passage 24, and outlet port 96 to a shower. This faucet unit is positioned parallel to a wall.

An alternative valve unit 73 is shown in FIG. 10, for use with the mixing device 10 which is also shown in an exploded perspective view. Valve unit generally 73 includes an upper housing 74 and a lower housing 75 joined by flanges 74' and 75' with seal 87 therebetween. A valve body 76 is housed inside upper housing 74 and receives the thermostatic mixing device 10. Cold water enters the intake passage 88, passes through passageway 77, orifice 78 and into passage 18. Simultaneously hot water enters intake passage 89, passes out of orifice 79 and into hot water passage 17. The regulation of the hot and cold water through the mixing device 10 is as previously explained. As the mixed water exits from passage 22, it is controlled by the movable valve disk 82 moving over the stationary valve disk 80 in the usual manner each having the standard pie shaped openings such as 81 for this purpose.

Movable valve disk 82 is rotated by the flow control knob 85 which is connected to the disk 82 by the pin 83 having reduced diameter ends 83' for seating in openings (not shown) in the knob 85 and disk 82. A seal 86 is placed between the knob 85 and the valve body 76. When assembled, a portion 85' of knob 85 extends out through opening 74' of housing 74 to be accessible. This valve unit would be positioned transversely to a wall.

It will therefore be appreciated that a thermostatic mixing of hot and cold water is achieved by the moving a disk extending through a body wall. This allows a convergence of a mixture of hot and cold water flow to a central zone and upstream of the wax cartridge. It also provides a positive force to assure a desired shut off of one of the two inlet streams of water when the other is turned off. Further, it permits the use of a regulator moving disk with a small thermal inertia in order to facilitate thermal exchange between the wax cartridge and the mixed water.

As seen in FIG. 1, the cartridge is stepped down and the outer walls of body 27 and housing 28 are tapered to afford a leaktight fit when placed in a plumbing fixture.

Yet another feature is the adaptability to various valve or faucet units. This is afforded by controlling water flow from the outlet. Outlet flow also results in easier control because of having to control only one stream of water.

While the preferred embodiments have been described above, it should be readily apparent to those skilled in the art that a number of modifications and changes may be made without departing from the spirit and scope of the invention. For example, while a plumbing valve has been shown, the valve can be used with other types of fluid valves. Also, the specific valve unit or faucet are not the only fixtures which can be used. For example, a faucet with a diverter valve could be employed for use with a tub and shower fixture. All such and other modifications within the spirit of the invention are meant to be in the scope of the invention.

We claim:

1. A fluid mixing device for controlling the temperature of hot and cold fluids, comprising:
   a body member having an internal chamber;
   at least one inlet to the chamber for bringing to the chamber a supply of hot fluid, one inlet to the chamber for bringing to the chamber a supply of cold fluid, and one outlet from the chamber for receiving from the chamber a mixture of the hot and cold fluids;
   a reciprocating member operatively positioned in the chamber and having a portion extending radially therefrom into the hot and cold fluid inlets; and
   a thermal expansion element connected to the reciprocating member, the thermal expansion element constructed and arranged to reciprocate the portion of the reciprocating member in the hot and cold fluid inlets in relation to the temperature of the hot and cold fluids.

2. The fluid mixing device of claim 1, wherein the inlets for supplying hot and cold fluids are defined by a common orifice that is divided by said portion of the reciprocating member.

3. The fluid mixing device of claim 2, wherein the body member is positioned in an outer valve cartridge housing.

4. The fluid mixing device of claim 3, wherein the housing retains filtering means upstream of both of the body member's inlets.

5. The fluid mixing device of claim 1, further comprising volume control means downstream of the outlet for regulating flow of the fluids from the mixing device.

6. The fluid mixing device of claim 5, further comprising temperature adjustment means connected to the thermal expansion element for regulating a steady state temperature of the fluid exiting the mixing device.

7. The fluid mixing device of claim 6, wherein the volume control means and temperature adjustment means are positioned at opposite axial ends of the mixing device.

8. The fluid mixing device of claim 6, wherein the volume control means and temperature adjustment means are concentrically positioned at the same axial end of the mixing device.

9. The fluid mixing device of claim 1, wherein said portion of reciprocating member also extends beyond an outside wall of the body member.

10. The fluid mixing device of claim 9, wherein said portion of the reciprocating member also sealingly abuts an inside surface of a housing.

* * * * *